United States Patent [19]
Olsen et al.

[11] Patent Number: 5,803,117
[45] Date of Patent: Sep. 8, 1998

[54] MULTI-ROUTE FULL SWEEP SELECTION VALVE

[75] Inventors: Kristine Olsen, Occidental; Brian Hauck, Santa Rosa, both of Calif.

[73] Assignee: Rheodyne, L.P., Cotati, Calif.

[21] Appl. No.: 660,872

[22] Filed: Jun. 10, 1996

[51] Int. Cl.⁶ .................................................. F16K 11/074
[52] U.S. Cl. .............................. 137/625.15; 137/625.11; 137/625.13
[58] Field of Search .......................... 137/625.11, 625.13, 137/625.15, 625.46

[56] References Cited

U.S. PATENT DOCUMENTS

| | | | |
|---|---|---|---|
| 2,719,426 | 10/1955 | Lamb | 137/625.11 X |
| 2,751,034 | 6/1956 | Ringo et al. | 137/625.11 X |
| 2,918,938 | 12/1959 | Kimball | 137/625.11 |
| 3,040,777 | 6/1962 | Carson et al. | 137/625.15 |
| 3,198,004 | 8/1965 | Roberts et al. | 137/625.15 X |
| 3,422,848 | 1/1969 | Liebman | 137/625.15 |
| 4,552,178 | 11/1985 | Olson | 137/625.46 |
| 5,010,921 | 4/1991 | Nohl | 137/625.46 |

Primary Examiner—John Rivell
Attorney, Agent, or Firm—Freilich Hornbaker Rosen

[57] ABSTRACT

A single selection valve allows the selection of three or more alternate flow routes without any unswept volume along any of the routes. The selection valve has a rotor (22) that can pivot about an axis (30) on a stator (12), the stator having ports (1–8) generally lying on a port circle (54) that is centered on the axis and the rotor having channels (60, 62) on its front face that faces the rear of the stator. Each rotor channel has a radial groove (70) with a port end (72) lying on the port circle, and each channel has an arc groove (74) that connects to the radial groove and that extends substantially circumferentially along an arc circle (76) that is centered on the axis, but that has a smaller radius than the radius of the port circle. The stator rear face has stator channels (90, 92), with each stator channel having a radial stator groove (94) with a port end (102) connected to one of the ports, and with a stator arc groove (96) that connects to the stator radial groove and that extends substantially circumferentially along the arc circle. Each stator arc groove and each rotor arc groove has a free end (80, 100), and the arc grooves extend sufficiently so their free ends overlap at every rotor position where fluid passes through the channels, to avoid any unswept volume.

7 Claims, 5 Drawing Sheets

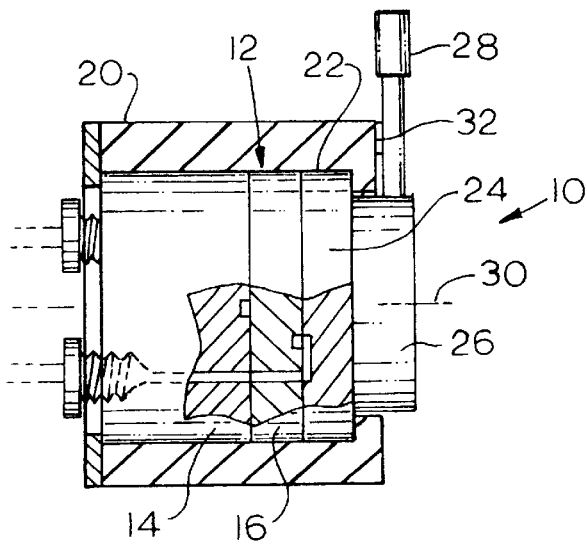
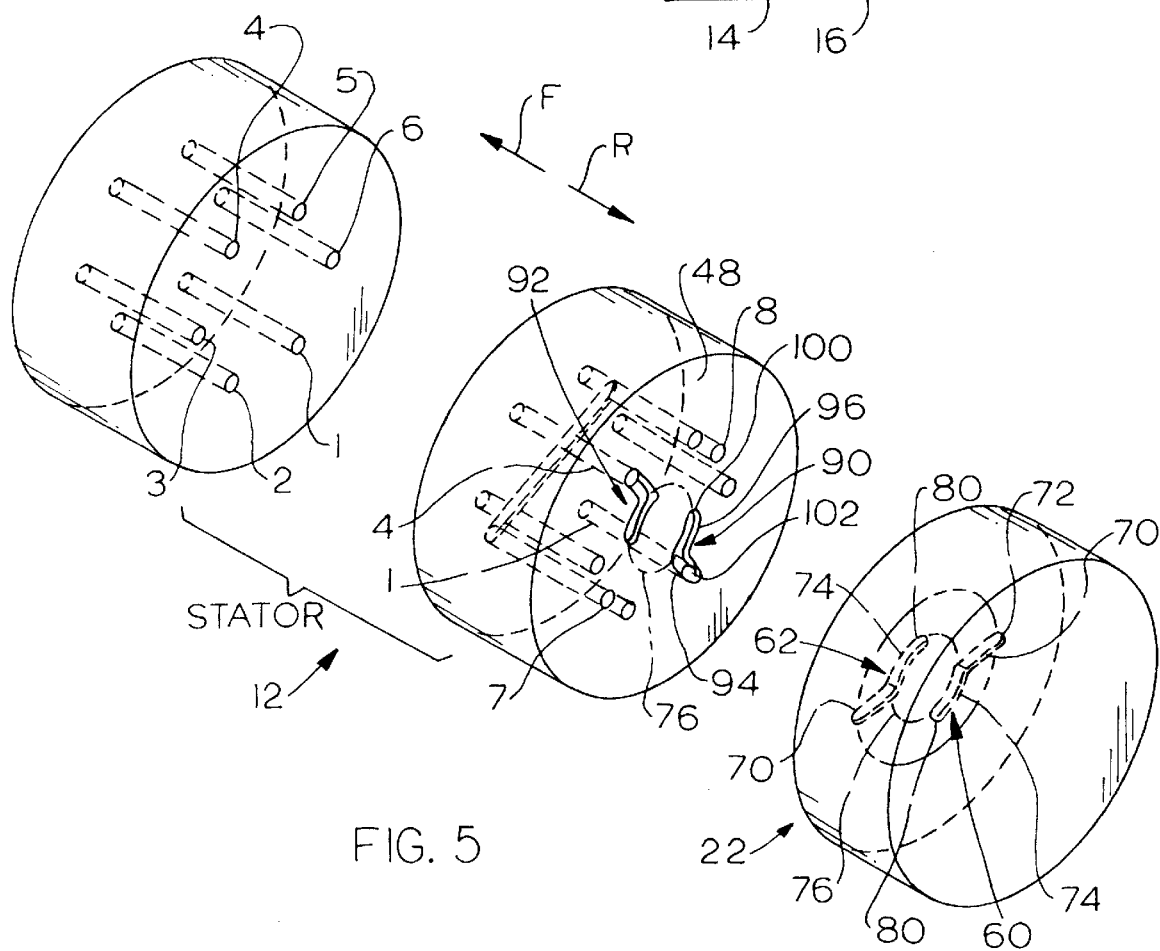

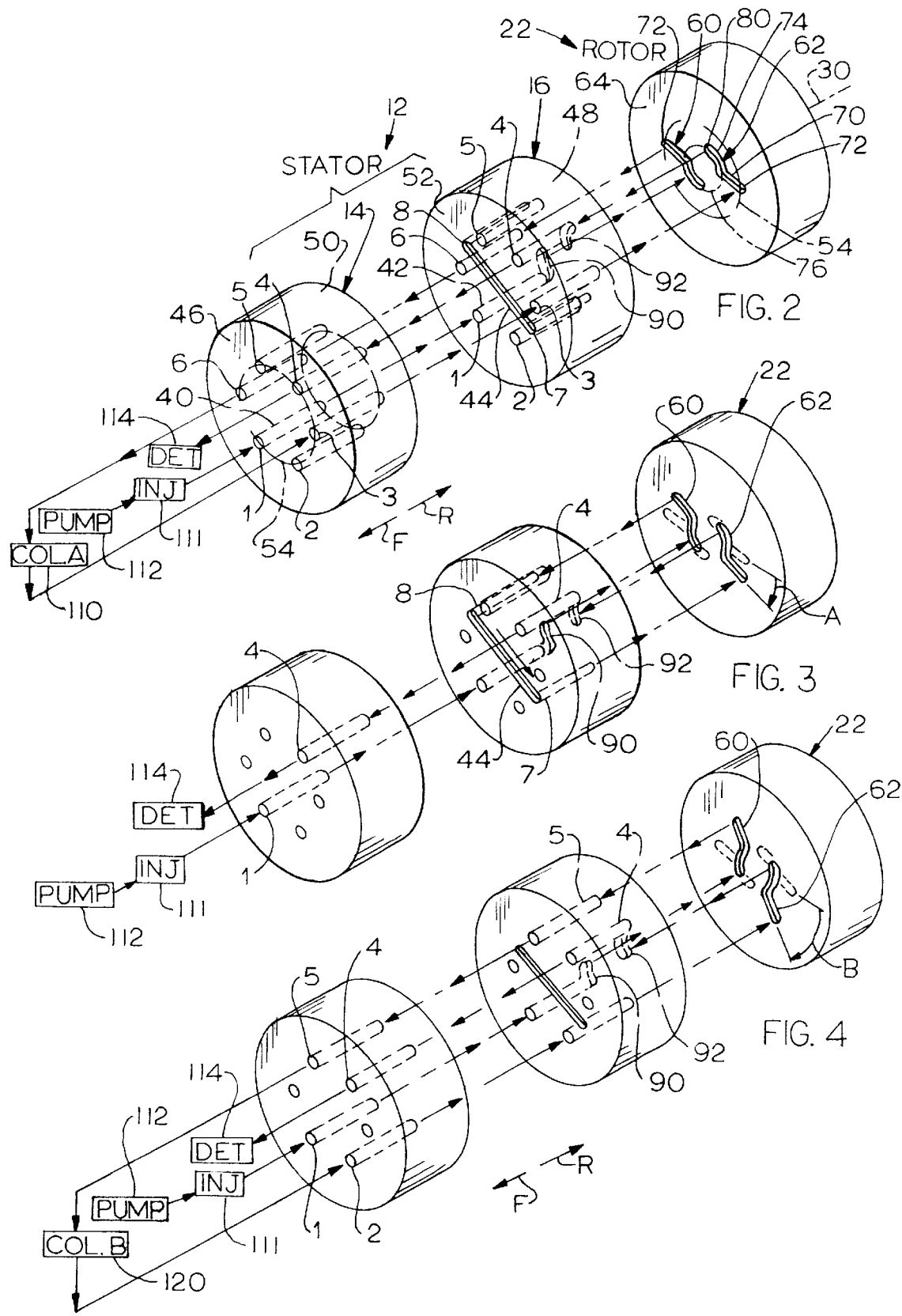

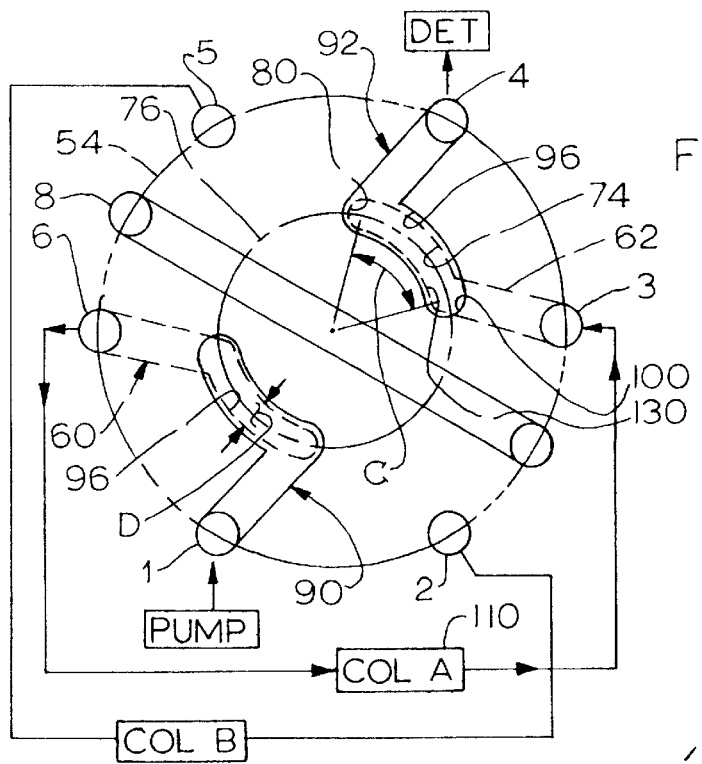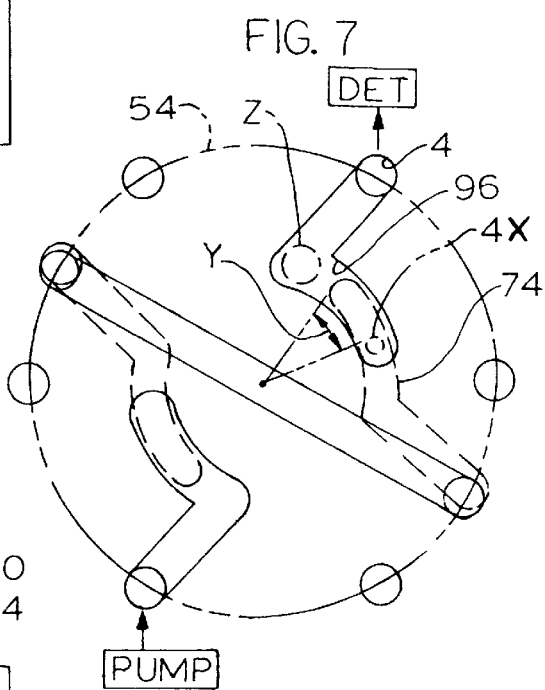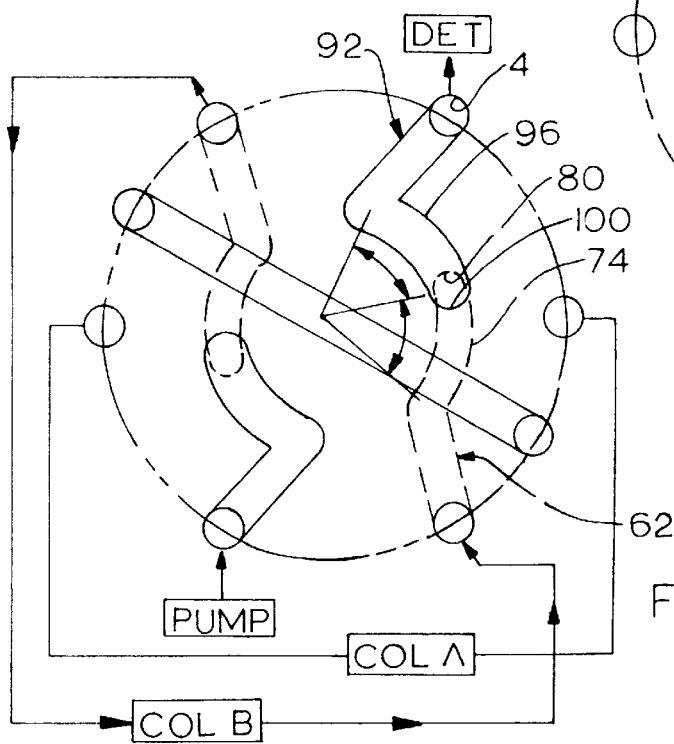

MULTI-ROUTE FULL SWEEP SELECTION VALVE

BACKGROUND OF THE INVENTION

Selection valves are commonly used in liquid chromatography and other analytical methods to direct fluid along alternate paths into a flowstream. Selection of alternate columns along the flow path is such an example. In these analytical methods, a carrier fluid (gas or liquid including supercritical fluid) is used to move samples of interest through the instrument. Unswept volume in the flow path is avoided, as an unswept volume can allow diffusion of sample into the unswept area or allow diffusion of carrier fluid (or a previous sample) out, thus diluting the sample and decreasing the resolution and sensitivity of the analytical method. In one example, two or more different chromatographic columns are connected to the selection valve, and a pump pumps a sample through a first column, overnight. However, if a computer senses chromatographic degrading in the first column, it automatically switches to a second or third column. In another case, the computer allows a first sample to be pumped through a first column, then allows a second sample to be pumped through a second column etc., with all pumping occurring overnight.

One type of selection valve includes a disc shaped rotor with channels on its front face that face holes or ports in the rear face of the stator. Pivoting of the rotor enables channels to connect to different columns depending on the position of the valve. There is no unswept volume in any part of the flow path, but selection is limited to only two alternate paths. Model 7030 of Rheodyne, L. P. is an example of this type of selector, which allows two columns but no third column for solvent changeover.

A second type of selection valve has a radial groove in the rotor and an additional center port in the stator. Pivoting the rotor in this case allows connection of any number of radial ports, to alternately connect to the common center port. This selector also has no unswept volume, but a second such valve is needed to re-direct the flow from the alternate path back to the main flow path. Model 7060 of Rheodyne, L. P. is an example of this type of selection valve, which requires two of such valves.

A third type of selection valve uses grooves on a plug type rotor to maintain connection to the common "in" and "out" ports as the rotor is pivoted and different columns are selected. When the free end of the groove lies in line with the port there is no unswept space. However, at other positions of the rotor the fluid does not pass through or near the free end of the groove and this becomes an unswept volume. Multiposition selector Model CST 4UW from Valco Instruments Company is an example of this type of selector, which has more than two column or flush positions, but with an unswept volume that gets larger at positions further from a first position.

There is a need for a single selector, or selection valve, that allows selection of at least three alternate flow routes by pivoting the rotor between at least three different angular positions, without having any unswept volumes in the flow path.

SUMMARY OF THE INVENTION

In accordance with one embodiment of the present invention, a selection valve is provided that can direct flow along at least three alternate flow routes without any unswept volume along each route. The selection valve includes a stator and includes a rotor that can pivot on a pivot axis, between a plurality of rotor positions. The stator has throughports while the rotor has rotor channels at a rotor-stator interface, with each rotor channel having a port end that can lie in line with one of the stator ports. Each of the rotor channels includes an arc groove extending substantially circumferentially about the pivot axis, with a free end furthest from the port end. The stator includes a plurality of stator channels at the interface, with each stator channel having an arc groove that overlaps the arc groove of a rotor channel. Each arc groove of a channel has a free end that is furthest from connection to one of the ports, with the free ends of the arc grooves overlapping at every rotor position wherein fluid passes through the channels.

In an arrangement wherein the stator has ports angularly spaced by a first angle such as 45°, but the rotor positions are spaced by another angle such as 30°, the stator is provided with extension grooves at the interface that extend by the difference, such as 15°.

The novel features of the invention are set forth with particularity in the appended claims. The invention will be best understood from the following description when read in conjunction with the accompanying drawings.

BRIEF DESCRIPTION OF THE DRAWINGS

FIG. 1 is a sectional view of a selection valve constructed in accordance with one embodiment of the present invention.

FIG. 2 is a simplified exploded front isometric view of the selection valve of FIG. 1, with the rotor in a first position, for passing fluid through a column A.

FIG. 3 is a view similar to that of FIG. 2, but with the rotor pivoted to a second position for flushing out the rotor and stator channels at the interface.

FIG. 4 is a view similar to that of FIG. 2, but with the rotor turned to a third position, for passing fluid through a column B.

FIG. 5 is a rear isometric view of the selection valve of FIG. 2.

FIG. 6 is a simplified view looking rearwardly along the pivot axis, with the selection valve in the first position of FIG. 2.

FIG. 7 is a view similar to that of FIG. 6, but with the selection valve in the second position, which is shown in FIG. 3.

FIG. 8 is a view similar to that of FIG. 6, but with the selection valve in the third position, which is shown in FIG. 4.

DESCRIPTION OF THE PREFERRED EMBODIMENTS

Figure 9:
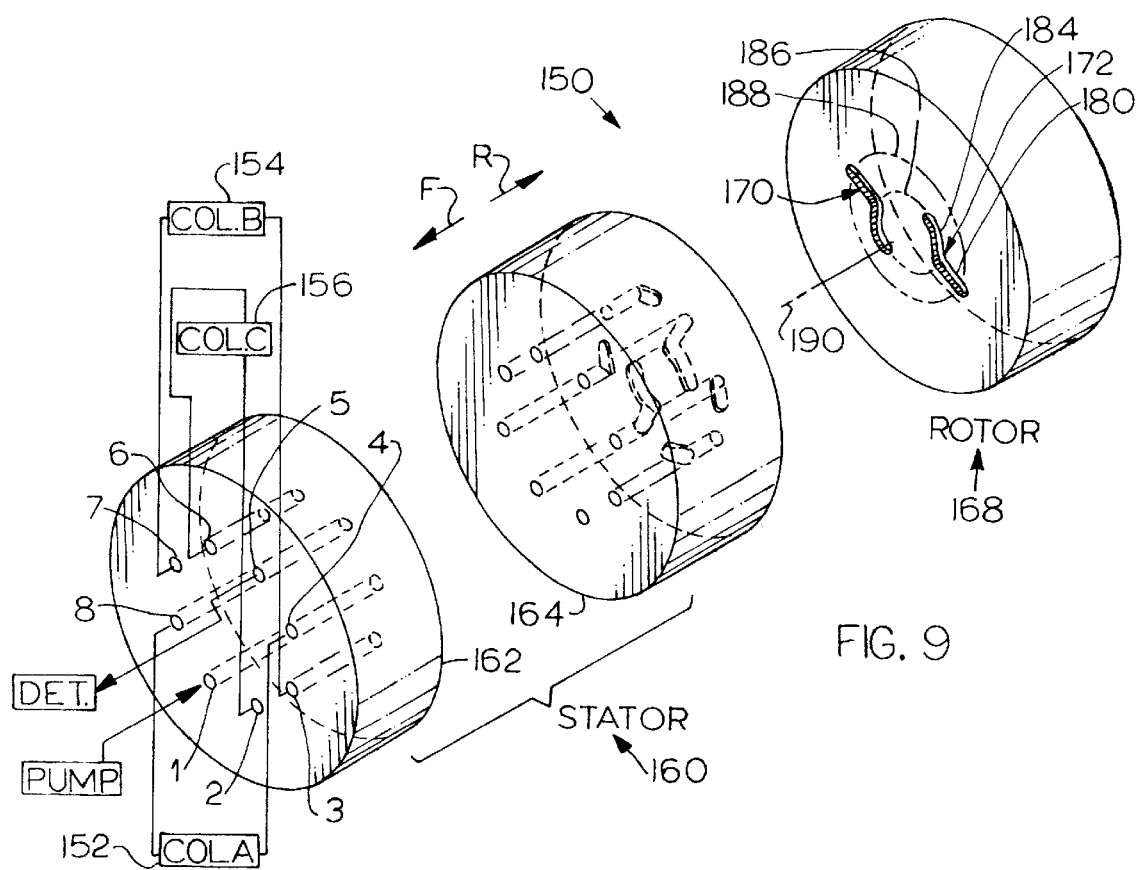
FIG. 9 is a simplified exploded front isometric view of a selection valve constructed in accordance with another embodiment of the invention, which enables flow through a selected one of three different external paths such as three different columns.

FIG. 1 illustrates a selection valve 10 of the present invention, which can receive a fluid sample to be analyzed and carrier fluid (e.g. saline solution), and which can divert the fluids through a selected one of different flow paths (e.g. through different chromatographic columns) and back through the selection valve to an analytical device. The selection valve includes a stator 12 comprising forward and rearward disc elements 14, 16 that are surrounded by a housing 20. The selection valve also includes a rotor 22 that includes a disc 24 and an extension 26 with an operator 28 that is usually motor operated but which can be manually operated. The operator 28 can be moved to turn the rotor about axis 30, between each of three different positions. Sensors or latches 32 are used to accurately position the rotor at each of the three rotational positions. A wide variety of known positioning mechanisms are available for this purpose.

FIG. 2 is a simplified view of the stator 12 and rotor 22, showing ports and channels therein. The stator has six throughports labeled "1, 2, 3, 4, 5, and 6" which extend axially through the complete thickness of the stator. This is achieved by aligned through holes 40, 42 in the front and rear stator elements 14, 16. The rear element 16 has a pair of flush ports 7, 8 which are not aligned with any holes in the front element 14, but with the front ends of the ports 7, 8 connected together by a flush groove 44. All of the six throughports 1–6 extend completely through the stator, between the front face 46 of the front element and the rear face 48 of the rear element 16, with the adjacent faces 50, 52 of the stator elements being sealed to each other. For convenience, all six throughports 1–6 and the two additional ports 7, 8 lie on an imaginary port circle 54 which is centered on the axis 30.

The rotor 22 has two rotor channels 60, 62 on its front face 64 which lies facewise adjacent to and is sealed to the stator rear face 48. Each of the channels such as 62, includes a radial groove portion or groove 70 with a port end 72 that lies on the port circle 54 (as seen in a view taken along the axis 30) to communicate with each of a plurality of stator ports as the rotor turns. Each channel also includes an arc groove portion or arc groove 74 which extends circumferentially with respect to the axis 30, along an arc circle 76. The arc circle 76 has a different diameter than the port circle 54, the particular arc circle 76 having a smaller diameter. Each arc groove has a free end 80 which is an end of the arc groove and of the channel lying furthest from the port end 72.

As best shown in FIG. 5, the rear face 48 of the stator 12 has a pair of stator channels 90, 92 that each have radial groove portions or grooves 94 and arc groove portions or grooves 96. Each arc groove extends circumferentially about the arc circle 76 and has a free end 100. The radial groove 94 connects with the arc groove, and has a port end 102 that connects to one of the ports, the port end 102 being shown connected to the port 1. The radial groove 94 extends with a radial directional component so its opposite ends lie at different distances from the pivot axis. The arc grooves 96 of the stator channels overlap the arc grooves 74 of the rotor channels to connect them, and with no unswept volume being present.

FIG. 2 shows the rotor in a first position, wherein it is used to pass carrier fluid (e.g. saline solution) and samples through a column 110 which is identified as "column A". Initially, a sample to be analyzed is entered into an injection valve or injector 111, as by the use of a syringe that injects the sample (at close to atmospheric pressure) into a chamber of the injector. A pump 112 pumps a carrier fluid through the injector 111, to pump the sample at high pressure into the front end of port 1. The fluid passes rearwardly entirely through the stator through port 1, and along the first stator channel 90 to the first rotor channel 60. The fluid passes along the first rotor channel 60 to its port end 72 and forwardly along the port 6. At the front end of port 6, the fluid flows through column A and from column A to port 3. The fluid moves rearwardly completely through the stator along port 3 to the port end 72 of the second rotor channel 62. The fluid moves from the free end 80 of the rotor channel 62 into the second stator channel 92, and forwardly along port 4. The fluid exits the stator at port 4 and may flow into a detector 114. It is noted that a chromatographic column such as 110 passes different components of a sample at different flow rates, so the least retained component exits the column first and reaches the detector 114 first, etc.

FIG. 3 shows the injector after the rotor has been rotated by an angle A of 30° from its initial position of FIG. 2. The configuration of FIG. 3 is used to wash out the channels. The configuration of FIG. 3 can be used to flush out all flow paths in instrument, including the pump, injector, and detector without passing the flushout fluid through either column A or B (shown in FIG. 4, connected between ports 2 and 5). Columns A and B will frequently require different (potentially incompatible) carrier fluids in their use. In the configuration of FIG. 3, changeover to the new carrier fluid can be accomplished without contaminating one column with carrier fluid used for the other and at velocities not possible when the fluid must pass through the highly restrictive and pressure sensitive columns. A flush solution or other fluid leaving pump 112 moves into port 1 of the selection valve (the injector 111 may contain no sample, or be switched so the fluid bypasses a sample-holding chamber). The fluid passes from port 1 through the first stator channel 90, through the first rotor channel 60, and forwardly along the stator port 8. The fluid moves diametrically along the flush groove 44, rearwardly along port 7, and into the second rotor channel 62. The fluid moves from the second rotor channel 62 to the second stator channel 92 which is connected to port 4 to exit from port 4. In the position of FIG. 3, all channels and ports common to the configurations of FIGS. 2 and 4 (where a sample passes through column A or column B) are completely flushed.

FIG. 4 shows a third configuration, wherein the rotor 22 has been turned by another angle B of 60°, from its initial position of FIG. 2. In this case, a sample from the injection valve or injector 111 passes rearwardly through port 1, along the first stator channel 90 into the first rotor channel 60, and forwardly along port 5 to another column 120 that is labeled "column B". Fluid from the column 120 passes rearwardly through port 2 into the second rotor channel 62 and from there to the second stator channel 92. The fluid moves from the second stator channel 72 forwardly through port 4 and out of port 4 to the detector 114.

FIGS. 6–8 are simplified views showing the injector in the positions FIGS. 2–4, respectively. FIG. 6 shows the rotor in a position wherein the rotor channels 60, 62 are positioned to pass fluid through column A 110. It can be seen that the arc groove 74 of each rotor channel extends by an angle C of 60°, between its free end 80 and an opposite proximate arc groove end 130. It may be noted that the arc groove 74 has a specified width D, and it is assumed that each end of the arc groove is largely like a circle of that diameter D, with the angle C being taken from the middle of each arc groove end. In reality, the width D of the groove is very small with respect to its length. In FIGS. 6–8, the rotor grooves 60, 62 are drawn to be of slightly smaller width than that of the stator grooves 90, 92, to aid in distinguishing them; in reality, they are preferably of the same widths.

Each arc groove 96 of a stator channel 90, 92 extends by the angle C of 60°, by which the rotor grooves extend. As a result, the free end 80 of each rotor arc groove 74 overlaps part of the corresponding stator channel arc groove 96 at all rotational positions of the rotor. Similarly, the free end 100 of each stator arc groove overlaps a corresponding rotor arc groove 74 at all rotational positions of the rotor. FIG. 8 is the most extreme position, but still shows that the free end 80 of the rotor arc groove 74 overlaps the free end 100 of the stator arc groove 96.

The overlapping of the free end of each rotor arc groove with a portion of a stator arc groove, and the overlapping of the free end of each stator arc groove with a portion of a rotor arc groove, at all rotational positions of the rotor, is of considerable importance. Such overlapping assures that there will not be any appreciable unswept volume in either channel. The presence of such unswept volume could result in some of a sample finding its way into such unswept or "dead" volume and later finding its way back to the stream near the end of the injection, when only carrier fluid is otherwise passing through the channel. Such mixing of a sample portion with carrier fluid that follows initial injection of the sample into a column, can result in false readings. Such unswept volume can also result in contamination of one column with potentially incompatible fluid used for the other column, since flushing would be incomplete in the flush position. Such unswept volume could be present if, for example, there were no arc groove 96 in FIG. 7, but instead the port 4 lay at the position 4X. In that case, the portion of the rotor arc groove 74 extending along the angle Y would constitute unswept volume in FIG. 7. It may be noted that it is possible to place some of the ports such as port 4 at a position other than on the port circle 54, such as at the position Z, although this is often not convenient.

Thus, the arc grooves of each rotor channel and of each stator channel extend along substantially the entire angle of rotation of the rotor, which is 60° in the example given in FIGS. 1–8. As a result, the free end of each rotor and stator arc groove is directly connected to a location along the corresponding arc groove that it communicates with, to avoid an unswept volume.

Figure 10:
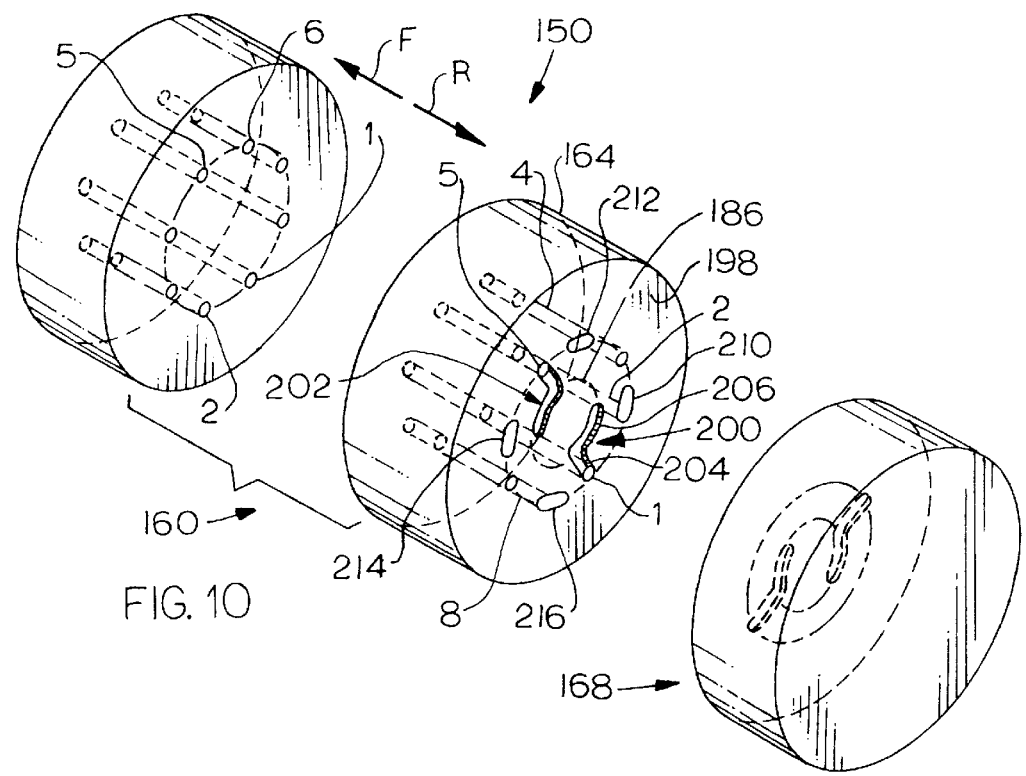
FIG. 10 is a rear exploded isometric view of the selection valve of FIG. 9.

FIGS. 9 and 10 illustrate a selection valve 150 which enables the pumping of fluid through a selected one of three different columns 152, 154, and 156. The stator 160 includes two disc elements 162,164, with eight ports 1–8 extending completely through both discs. The rotor 168 has the same construction as the rotor of FIG. 2, in that it includes a pair of rotor channels 170, 172 that each has a radial groove 180 and an arc groove 184 that extends by 60° and that lies on an arc circle 186 that is of smaller diameter than a port circle 188, with both being centered on an axis of rotation 190. As shown in FIG. 10, the stator rear disc element 164 has a pair of stator channels 200, 202, of the same construction as the stator channels 90, 92 of FIG. 5. That is, each stator channel has a stator arc groove 206 lying on the arc circle 186 and connected to a radial groove 204 that connects to one of the ports 1 or 5. In addition, the rear face 198 of the stator has four extension grooves 210, 212, 214, and 216 that connect to corresponding ports 2, 4, 6, and 8. The extension grooves are provided because, while the ports 1–8 are spaced apart by 45°, the rotor turns by 30° or 60° from its initial position.

Figure 11:
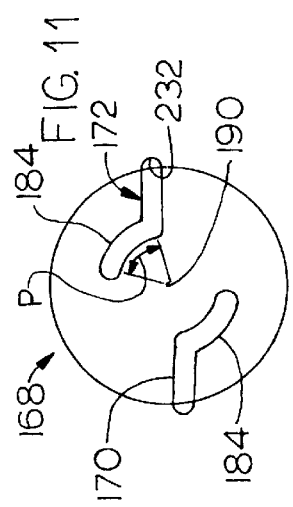
FIG. 11 is a simplified axial view looking rearwardly along the pivot axis, of only the rotor of the selection valve of FIG. 9, with the rotor shown in a first position.
Figure 12:
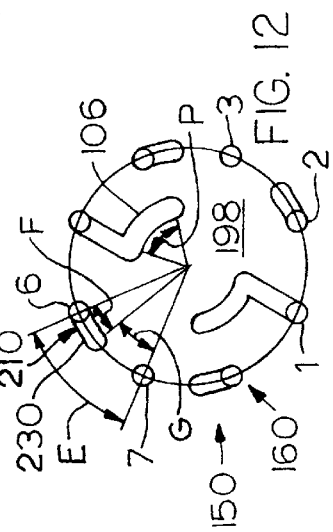
FIG. 12 is a simplified axial view looking rearwardly along the pivot axis, showing the ports and channels of only the stator of the selection valve of FIG. 9.

FIGS. 11–19 are simplified views taken along the axis 190, from the front of the selector valve. It can be seen in FIG. 11, which shows only the rotor 168, that the arc grooves 184 of the rotor channels each extends by an angle P of 60° about the pivot axis 190. FIG. 12 shows that the arc grooves 106 in the rear face 198 of the stator also extend by an angle P of 60°. Also, it can be seen that each of the ports such as 6 and 7 are spaced apart by an angle E of 45°. Each of the extension grooves 210 extends by an angle F of 15°, so that a free end 230 of an extension groove and an adjacent port 7 are spaced by an angle G of 30°, which is the angle of each step of the rotor.

Figure 13:
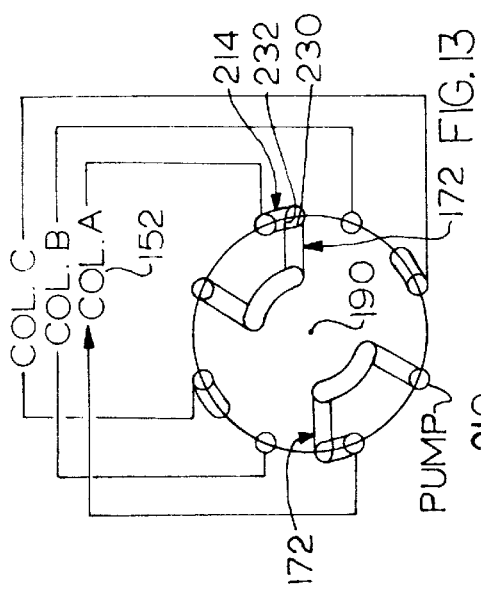
FIG. 13 is a simplified axial view looking rearwardly along the pivot axis, showing the rotor and stator of FIGS. 11 and 12 overlaid and in the first position, for fluid flow through column A.
Figure 14:
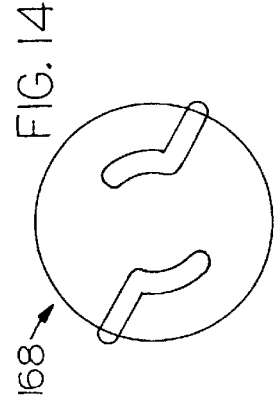
FIGS. 14, 15, and 16 are similar to those of FIGS. 11, 12, and 13, but with the rotor in a second position for flowing fluid through a column B.
Figure 15:
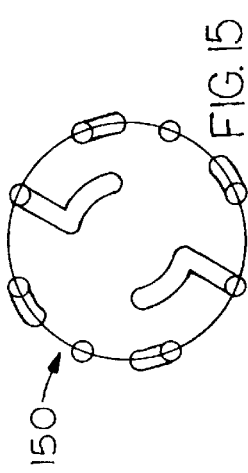

FIG. 13 shows the rotor of FIG. 11 and stator of FIG. 12 superimposed, in the initial position, wherein fluid flows through the first column 152. In this position, the port end 232 of each rotor channel 170, 172 is connected to the free end 230 of an extension groove 210.

Figure 16:
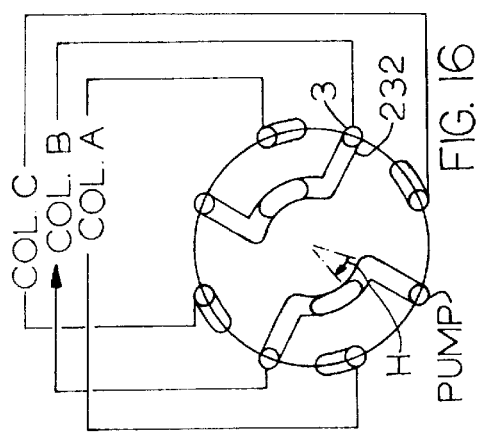
Figure 17:
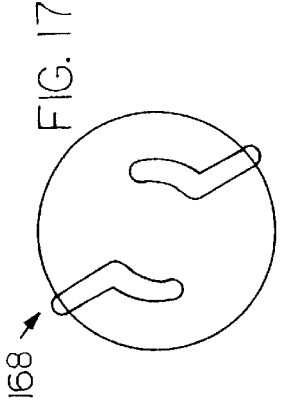
FIGS. 17, 18, and 19 are similar to those of FIGS. 14, 15, and 16, but with the rotor in a third position, to flow fluid through a column C.
Figure 18:
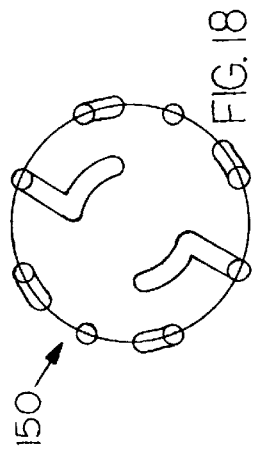
Figure 19:
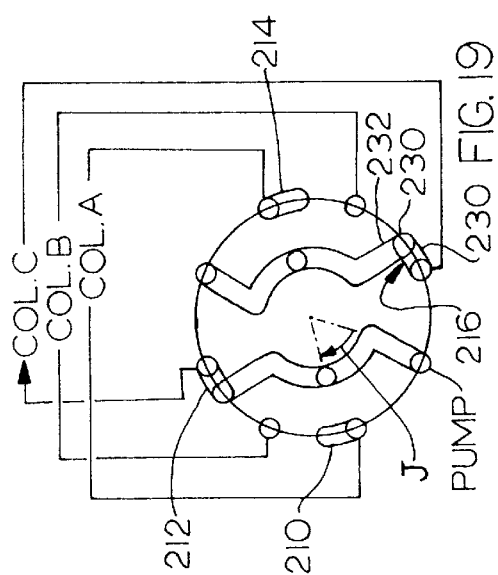

FIG. 16 shows a configuration wherein the rotor has been turned by an angle H of 30°, and its port end 232 is aligned directly with one of the ports 3. FIG. 19 shows the stator after it has been turned by an angle J of 60°. In this configuration, the port ends 232 of the rotor channels are connected to the free ends 230 of other extension grooves 212, 216 that extend from ports 6 and 2. It is noted that the extension grooves 216, 214 extending from the two ports 2, 4 extend towards each other, so that even though the two ports 2, 4 are spaced apart by 90°, the free ends of their extension grooves are angularly spaced by 60°.

In a selection valve of the design shown in FIGS. 1–8 that applicant has designed, the ports 1–8 lay on a port circle 54 having a diameter of 8 cm, and the arc grooves such as 74 lay on an arc circle 76 having a diameter of 4 cm. Each of the ports 1–8 and channels 60, 62, 90, 92 had a width of 0.25 mm.

Thus, the invention provides a selection valve wherein the rotor can be turned through at least three different positions to direct fluid along three different flow paths, and yet there is substantially no unswept volume or "dead space" along the flow path within the injector for any of the positions. This is accomplished by providing channels in the front face of the rotor and in the rear face of the stator, where each channel has an arc groove that extends circumferentially about the pivot axis. Each arc groove extends far enough that the free end of each rotor arc groove is always directly (in an axial flow direction) open to the corresponding stator arc groove, and vice versa. This results in flow occurring through substantially all of each arc groove, to avoid a dead space where a sample or carrier fluid can accumulate. In a selection valve wherein the rotor pivots by a predetermined angle such as 30° between positions, but the ports of the stator are spaced by a different distance such as 45°, the port end of each rotor channel can be coupled to a corresponding port by provision of extension grooves in the rear face of the stator, that extend at least partially circumferentially from a port.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A selection valve which includes a stator and which includes a rotor that is pivotally mounted about a pivot axis with respect to said stator to pivot between each of a plurality of rotor positions, wherein said stator has a plurality of largely axially-extending ports and wherein said rotor has a plurality of rotor channels at the rotor-stator interface, wherein:

said stator has a plurality of stator channels at said rotor-stator interface, with each of said stator channels connected to one of said ports;

said rotor channels and said stator channels each have arc grooves extending substantially circumferentially about said pivot axis, with the arc groove of a first of said rotor channels overlapping the arc groove of a first of said stator channels in each of a first plurality of said rotor positions.

2. The selection valve described in claim 1 wherein:

said first stator channel has a port end which is connected to one of said ports and the arc groove of said first channel has a free end which lies furthest from said port end;

said first rotor channel has a port end which is positioned to connect to a different one of said ports in each of said plurality of rotor positions, and said arc groove of said first rotor channel has a free end which lies furthest from said port end of said first rotor channel;

said arc groove of said first stator channel and said arc groove of said first rotor channel, each extends circumferentially sufficiently that their free ends overlap each other in each of said plurality of rotor positions.

3. A selection valve which includes a stator and which includes a rotor that is pivotally mounted about a pivot axis with respect to said stator to pivot between each of a plurality of rotor positions, wherein said stator has a plurality of largely axially-extending ports, and wherein said stator has a rear face and said rotor has a front face that lies facewise against said stator rear face at a rotor-stator interface, wherein:

said rotor front face has first and second rotor channels, with said first rotor channel having a radial groove that extends with a radial directional component and that has a port end lying on a first port circle wherein a plurality of said ports lie on said first port circle, and with said first rotor channel having an arc groove that connects to said radial groove and that extends substantially circumferentially along part of an arc circle that is centered on said axis but that has a radius that is different from the radius of said first port circle, as viewed along said axis, with said arc groove having a free end that is furthest from said port end of said rotor channel;

said stator rear face has first and second stator channels that each has a stator radial groove with a port end opening to one of said ports, and with each stator channel having a stator arc groove that connects to one of said stator radial grooves and that extends substantially circumferentially along said arc circle, with each of said stator radial grooves having a free end that is furthest from the corresponding port end of the stator channel;

said rotor arc grooves and said stator arc grooves each extends circumferentially about said axis, by sufficient amounts so their free ends overlap at each of said plurality of said rotor positions.

4. The selection valve described in claim 3 wherein:

said plurality of positions includes first, second, and third positions, with said and third positions angled substantially 30° and 60°, respectively from said first position;

said first stator channel arc groove and said first rotor channel arc groove each extends by about 60° about said axis, and overlap by about 60° in said first position and overlap substantially only at their free ends in said third position.

5. The selection valve described in claim 4 wherein:

said stator has six ports that are angularly spaced apart by 60°;

said three positions of said rotor are angled apart by 30°; and said stator has a pair of flush ports which each extends only partly through the axial length of the stator and which are connected together within said stator and which are open at said stator rear face, but that lie angularly between and that are spaced 30° from two of said ports.

6. The selection valve described in claim 4 wherein:

said stator has eight ports that each extends through the entire axial length of the stator and that are angularly spaced by 45°;

said three positions of said rotor are angled by 30°;

first, second, and third of said ports lie in positions wherein said second port lies between and is spaced 45° from said first port and from said third port;

said rear face of said stator has first and second extension grooves, said first extension groove extending about 15° from said first port toward said second port and having a free end spaced 30° from said second port, and second extension groove extending about 15° from said third port toward said second port and having a free end spaced 30° from said second port.

7. A selection valve which includes a stator and which includes a rotor that is pivotally mounted about a pivot axis with respect to said stator to pivot between each of at least three rotor positions, wherein said stator has a plurality of largely axially-extending ports, and wherein said stator has a rear face and said rotor has a front face that lies facewise against said stator rear face at a rotor-stator interface, and said rotor front face has a plurality of channels for connecting different pairs of said ports at different ones of said rotor positions wherein:

said ports have rear ends that lie on a port circle that is centered on said axis;

said ports are angularly spaced by a first angle;

said positions of said rotor are angled by a second angle that is less than said first angle;

first, second, and third of said ports lie in positions wherein said second port lies between said first and third ports and is spaced by said second angle from said first port and from said third port;

said rear face of said stator has first and second extension grooves, said second extension groove extending around said port circle and having a free end spaced by said second angle from said second port, and said second extension groove extends around said circle and has a free end spaced by said second angle from said second port.

* * * * *